United States Patent [19]

Cheng

[11] 4,390,142
[45] Jun. 28, 1983

[54] CORD REEL ASSEMBLY

[76] Inventor: Yue C. Cheng, Flat A, 6/F, 8 Broadcast Dr., Kowloon, Hong Kong

[21] Appl. No.: 291,356

[22] Filed: Aug. 10, 1981

[51] Int. Cl.³ .......................................... B65H 75/40
[52] U.S. Cl. .................................... 242/96; 242/100.1
[58] Field of Search ............. 242/100.1, 107.1, 107.11, 242/107.12, 107.13, 107.14, 107.15, 86.1, 96; 24/71.2, 71.3

[56] References Cited

U.S. PATENT DOCUMENTS

| 447,889 | 3/1891 | Matteson | 242/107.11 |
|---|---|---|---|
| 2,926,865 | 3/1960 | Humphreys | 242/107.13 |
| 3,208,121 | 9/1965 | Price | 242/100.1 X |
| 3,260,472 | 7/1966 | Zolot | 242/107.12 |

FOREIGN PATENT DOCUMENTS

| 345050 | 4/1960 | France | 242/100.1 |
|---|---|---|---|
| 391188 | 4/1933 | United Kingdom | 242/100.1 |

Primary Examiner—John M. Jillions
Attorney, Agent, or Firm—Thomas R. Vigil

[57] ABSTRACT

The cord reel assembly comprises first and second identical hub-forming members. A plate is positioned between the inner ends of abutting cylindrical sections of the hub-forming members. First and second identical annular opposed shell members are held between outer symmetrical opposed disc sections of the respective hub-forming members. Each shell member has an outer inwardly positioned circumferential edge where each such shell member abuts the opposed shell member. A rivet-like member is provided for holding the cylindrical sections together with the plate situated between the inner ends of the cylindrical sections to form a hub assembly with each disc section bearing against one of the shell members to hold the shell members in place with the inner edges thereof in abutting relationship. Each shell member has a notch extending into the shell member from the outer circumferential edge thereof and adapted to register with an opposed identical notch in the opposed shell member. The plate has a radially extending slot therein adapted to be rotated into alignment with the notches when the notches are in registry with each other for receiving a loop of a cord. Manually manipulatable ribs are provided on the outer surface of each disc section of each hub-forming member for enabling the hub assembly to be rotated by hand relative to the shell members after a loop of cord has been inserted through the aligned notches and into the slot for winding up excess cord.

8 Claims, 5 Drawing Figures

CORD REEL ASSEMBLY

BACKGROUND OF THE INVENTION

1. Field of the Invention

The present invention relates to reel assemblies of the type in which a loop of a cord can be inserted and then part of the assembly can be manipulated to wind up excess cord within the assembly.

2. Description of the Prior Art

Heretofore a number of storage reel assemblies for storing a length of cord have been proposed. Examples of such cord reel storage assemblies are disclosed in the following U.S. patents.

| U.S. PAT. NO. | PATENTEE |
| --- | --- |
| 592,787 | Judy et al. |
| 1,147,599 | Bordwell |
| 1,186,131 | Replogle |
| 1,609,309 | Renz |
| 2,576,335 | Fanslow |
| 2,567,869 | Bottger |
| 2,865,071 | Clemens |
| 2,656,991 | Neely |
| 2,952,420 | Von Hoorn |
| 2,991,523 | Del Conte |
| 3,208,121 | Price |
| 3,782,654 | Kasa |
| 3,809,331 | Gaul |

In particular, U.S. Pat. No. 3,208,121 discloses a storage reel for storing excess cord. This storage reel comprises a pair of annular shell halves which are identical in construction and which are received about an integral tubular hub and disk-like member which is positioned between the shell halves and rotatable within the enclosure formed by the two shell halves when they are situated adjacent each other. Two hub clips are received within the tubular hub member with one clip having an end plate and the other clip having an end plate with a fingergripping piece molded thereon. Each hub clip comprises a pair of spaced apart prongs of arcuate cross section and the two pairs of prongs of the hub clips are received within the tubular portion in a mating configuration with one rotated 90° relative to the other. The inner tubular surface of the tubular hub member has bosses thereon which are adapted to engage with the shank or end portions of the hub clip prongs so that rotation of the hub clip with the finger piece thereon causes rotation of both the other hub clip and the integral tubular hub member and disk-like member.

The shell halves have slots therein which are adapted to be aligned with each other to provide an entrance opening into the interior of the storage reel. Also the disk-like member has a longitudinally disposed notch therein which is adapted to be aligned with the opening formed by the aligned slots in the shell halves so that a loop of a cord can be inserted into the storage reel and into the notch. Then, by gripping the finger piece, the tubular hub with the disk-like member integral therewith can be rotated to rotate a loop of cord to coil it within the storage reel on the tubular hub on either side of the disk-like member and within the shell halves.

The cord reel assembly of the present invention has a similar function as the storage reel disclosed in U.S. Pat. No. 3,208,121. However, as will be described in greater detail hereinafter, the cord reel assembly of the present invention differs from the storage reel disclosed and claimed in U.S. Pat. No. 3,208,121 by providing a simpler assembly and construction of parts whereby two identical hub-forming members, two identical shell members, a central plate and a plastic rivet-like member all made of simple plastic construction are provided in place or two identical shell halves, and integral tubular hub and plate member, one hub clip member having an end plate and one hub clip member having a finger piece on the end plate thereof. Also, the cord reel assembly of the present invention differs from the previously proposed storage reel by providing a central rivet-like member which is cemented to the hub-forming member to hold the parts of the assembly together, by providing hand manipulatable gripping means on each side of the reel assembly and by having the hand grippable means recessed to provide unobstructed sides on the cord reel assembly. Additionally, the cord reel assembly of the present invention by reason of the design and configuration of the parts thereof uses a minimum of plastic.

SUMMARY OF THE INVENTION

According to the invention there is provided a cord reel assembly for receiving a loop of a cord through an opening in the assembly such that the loop can be wound up within the cord reel assembly, said cord reel assembly comprising first and second identical hub-forming members, each hub-forming member having a cylindrical section with an inner end facing toward the inner end of the cylindrical section of the other member and having an annular disc shaped section extending outwardly from said cylindrical section at the outer end thereof, a plate positioned between said inner ends of said cylindrical sections of said hub-forming members, first and second identical annular opposed shell members, each having a generally concave cross section in a radial direction that extends from an inner circumferential edge thereof upwardly and inwardly toward an outer inwardly positioned circumferential edge where each such shell member abuts the opposed shell member, said disc section of each hub-forming member having an outer circumferential edge which overlaps, on the outside, said inner edge of one of said shell members, means for holding said cylindrical sections together with said plate situated between the inner ends thereof to form a hub assembly with said outer circumferential edge of each said disc section bearing against one of said shell members to hold said shell members in place with the outer circumferential inner edges thereof in abutting relationship, said shell members having means for limiting relative rotation therebetween, each shell member having a notch extending into said shell member from the outer circumferential edge thereof and adapted to register with an opposed identical notch in the opposed shell member, said plate having a radially extending slot therein adapted to be rotated into alignment with said notches when said notches are in registry with each other for forming means for receiving a loop of a cord, and manually manipulatable means on the outer surface of each disc section of each hub-forming member for enabling said hub assembly to be rotated by hand relative to said shell members after a loop of a cord has been inserted through said aligned notches and into said slot for winding up excess cord.

DESCRIPTION OF THE PREFERRED EMBODIMENT(S)

Figure 1:
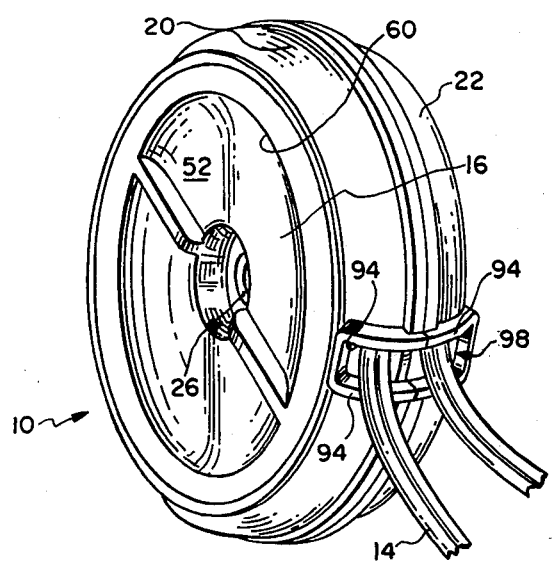
FIG. 1 is a perspective view of the cord reel assembly of the present invention with a loop of a cord inserted therein.

Referring now to the drawings in greater detail, there is illustrated therein a cord reel assembly 10 which is particularly adapted to receive a loop 12 of a cord 14 therein for winding up an excess portion of the cord 14 within the reel assembly 10.

Figure 4:
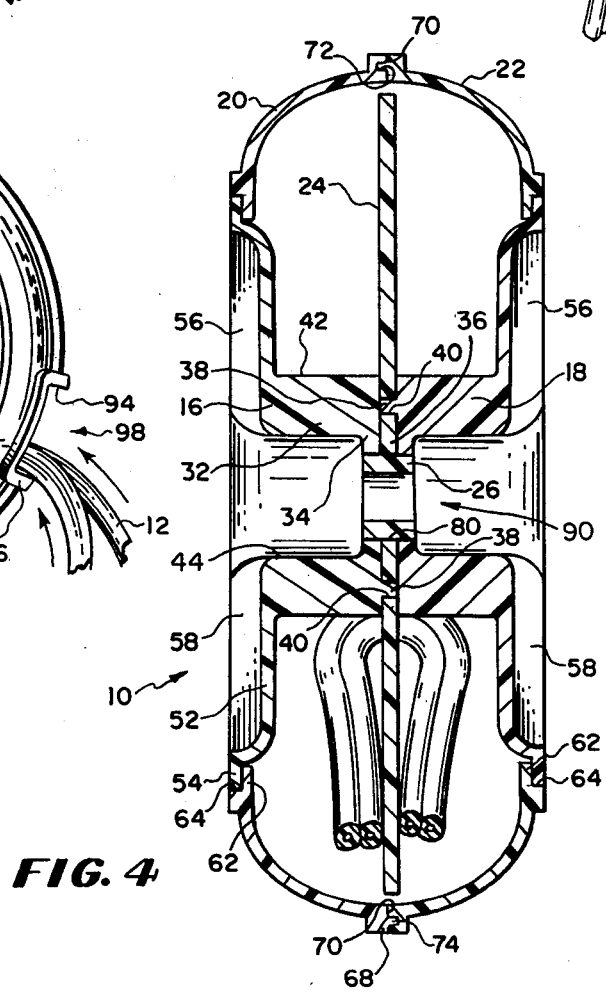
FIG. 4 is a vertical sectional view taken along line 4—4 of FIG. 3.

According to the teachings of the present invention, the cord reel assembly 10 is made of simple construction and with parts that are all made of plastic. As best shown in FIG. 4, the cord reel assembly 10 comprises first and second identical hub-forming members 16 and 18, first and second identical shell members 20 and 22, a circular plate 24 positioned between the hub-forming members 16 and 18 and a plastic rivet-like member 26 for holding the hub-forming members 16 and 18 together with the circular plate 24 held therebetween.

Since the hub-forming members 16 and 18 are identical and since the shell members 20 and 22 are identical, only hub-forming member 16 and shell member 20 will be described in detail.

As shown, the hub-forming member 16 has a cylindrical section 32 which has an inner end plate forming portion 34 with an annular surface or face 36 which is positioned to face toward the annular end surface 36 on the other hub-forming member 18. The annular surface 36 has a projection 38 extending therefrom which is received within one of two apertures 40 in the plate 24.

The cylindrical section 32 has an outer cylindrical surface 42 and an inner cylindrical surface 44. Also, extending through the end plate 34 for receiving the rivet-like member 26 is a central opening 46 which is of smaller diameter than the diameter of the inner cylindrical surface 44.

At an outer end of each cylindrical section 32, each hub-forming member 16 (18) includes a disc section 52 which extends radially outwardly from the outer cylindrical surface 44 and then curves axially outwardly to a radially extending, annular end flange 54.

On the outer facing surface of each disc section 52 is a pair of diametrically aligned ribs 56, 58, each of which extends from the inner cylindrical surface 44 to the end flange 54.

Since the disc section 52 curves outwardly to the annular end flange 54, a recessed area 60 is formed and the ribs 56 and 58 extend essentially across the recess 60 which provides an unobstructed side of the cord reel assembly 10. The ribs 56 and 58 facilitate gripping of the hub-forming member 16 by hand so that the hub-forming member 16 can be turned.

Figure 5:
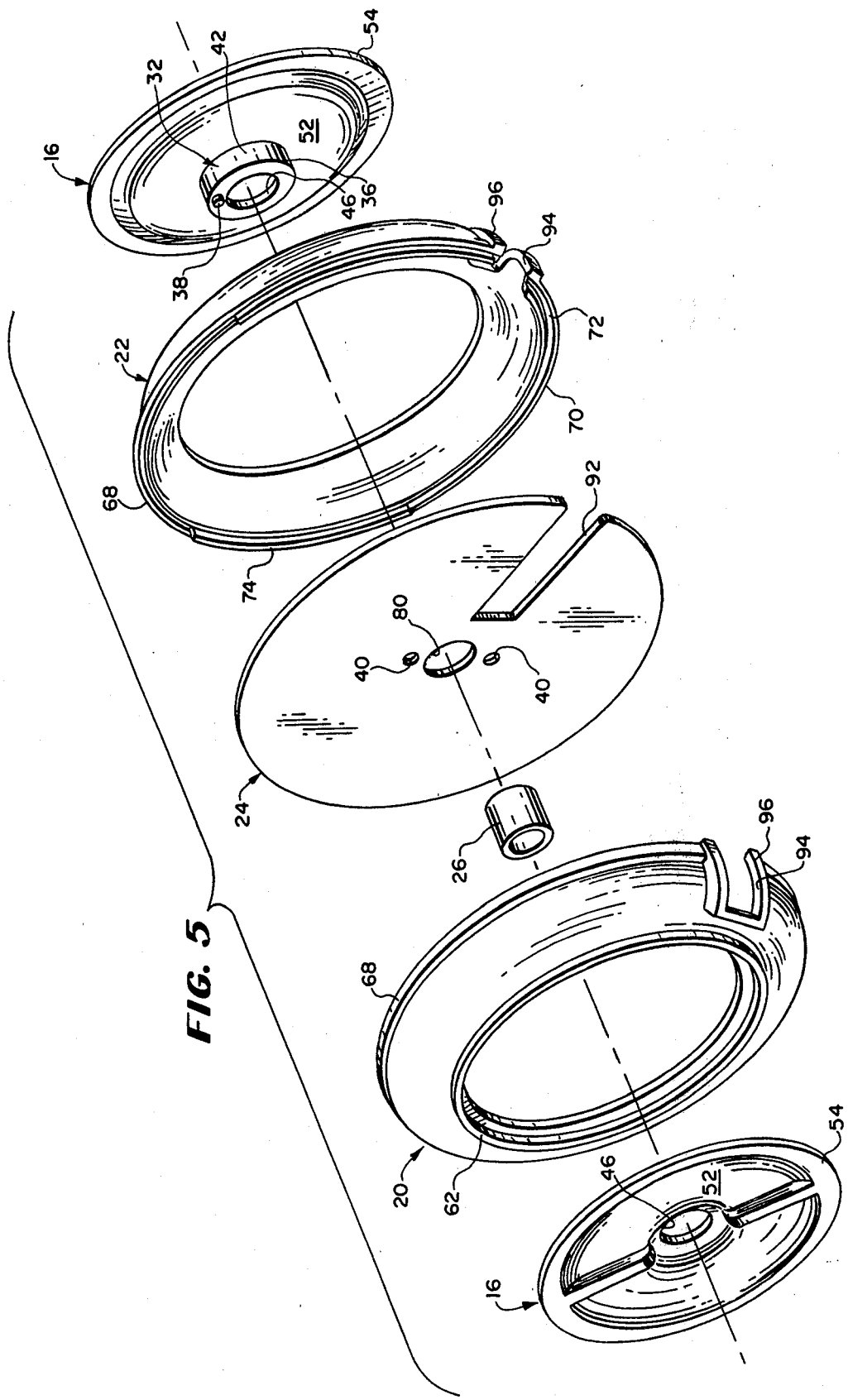
FIG. 5 is an exploded perspective view of the cord reel assembly.

As shown, the shell member 20 has an inner radial edge 62 which has an annular cutaway, step or shoulder formation 64 against which the end flange 54 is positioned. The shell member 20, in cross section, then extends arcuately outwardly and inwardly toward the plane containing the plate 24 and to an inner circumferential edge 68 as shown in FIGS. 4 and 5. In this way, each shell member 20 and 22 is generally concave and approximates one quarter of a hollow toroid. As shown, the shell members 20 and 22 are arranged to be held in place between the annular end flanges 54 of the disc sections 52 and abut each other at their outer inwardly positioned circumferential edges 68 such that the two shell members 20 and 22 when held together form the outer portion of a toroidal shell.

As shown in FIG. 5, the outer inwardly facing edge 68 of each shell member 20, 22 has an annular face 70 with an annular groove 72 therein extending part way around the annular face. An arcuate rib 74 extends outwardly from the annular face 70 between the ends of the annular groove 72 and is adapted to be received in the annular groove 72 in the opposing annular face 70 on the outer inwardly facing edge 68 of the other shell member 22. The two ribs 74 form means for limiting relative rotation of the shell members 20 and 22 so that the shell members 20 and 22 can be rotated relative to each other until the end of one rib 74 abuts the end of the other rib 74.

The circular plate 24 is positioned between the annular end surfaces 36 of each cylindrical section 32 with a projection 38 extending therefrom as described above. The plate 24 has a central opening 80 therein which is of the same diameter as the central end openings 46 through the end plate-forming portions 34 of the cylindrical sections 32. The two apertures 40 in the plate 24 are diametrically aligned on either side of the central opening 80 and are adapted to receive the projections 38 therein. In this way, the hand manipulatable ribs 56 and 58 on the surface of one disc section 52 are in alignment with the ribs 56 and 58 on the other disc section.

The rivet-like member 26 can be inserted and heat swaged in place, or heat welded or secured by a solvent or cement for quick assembly of the cord reel assembly 10.

Typically, the hub-forming members 16 and 18 with the plate 24 therebetween are assembled with the shell members 20 and 22 held in place as shown in FIG. 4. Then the plastic rivet-like member 26 with solvent on the outer surface thereof is inserted through the aligned openings 46 and 80 to secure the hub-forming members 16 and 18 together with the plate 24 held therebetween thereby to form a hub assembly 90. The shell members 20 and 22 are held in place around and with the hub assembly 90 to form the cord reel assembly 10.

Figure 2:
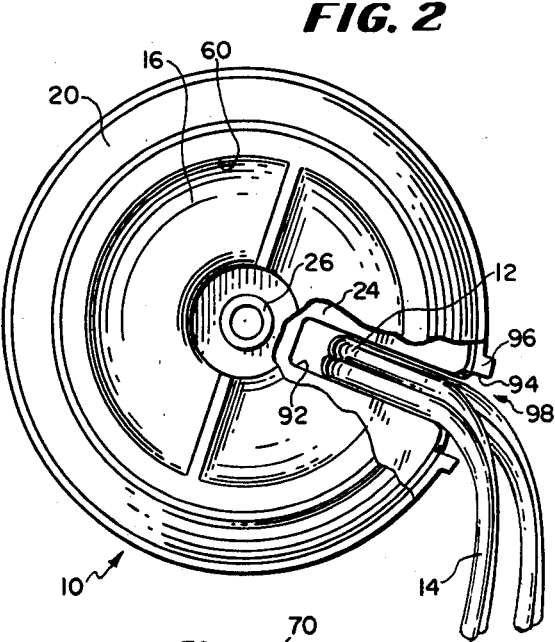
FIG. 2 is a side elevational view of the cord reel assembly shown in FIG. 1.
Figure 3:
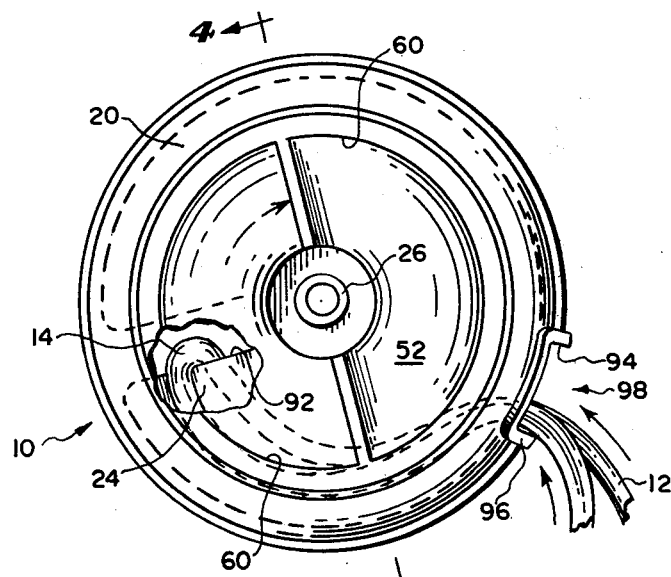
FIG. 3 is a side elevational view similar to FIG. 2 but with the loop of cord and a plate of a hub assembly inside the cord reel assembly shown in phantom in a position after the cord and plate have been rotated from the position shown in FIG. 2 and with a portion broken away to show the bight of the loop in a slot in the plate.

As shown in FIGS. 2, 3 and 5, the plate 24 has a radially extending slot 92 therein. Each of the shell members 20 and 22 has a notch 94 formed therein which extends from the annular face 70 part way into the shell member 20, 22. Each shell member is provided with a raised collar 96 around each notch 94 and the notches 94 are adapted to be aligned with each other when the shell members 20 and 22 are rotated relative to each other and one end of one rib 74 abuts an end of the other rib 74. In this abutting position of the ribs 74, the notches 94 are aligned as shown in FIGS. 1, 2 and 3. When they are aligned in registry, the notches 94 form an opening 98 for receiving the loop 12 of the cord 14. Then, by holding the shell members 20 and 22 in place in one hand, an operator can grip the ribs 56 and 58 and rotate the hub assembly 90 to bring the slot 92 in the plate 24 in alignment with the opening 98 formed by the notches 94 in registry. Then the cord loop 12 is inserted into the cord reel assembly 10 through the opening 98 and into the slot 92 after which the hub assembly 90 can be rotated by means of manipulation of the ribs 56, 58 to coil the cord 14 into the cord reel assembly 10 until the desired amount of excess cord 14 has been reeled into the assembly 10. Also, if desired, one of the shell members 20 can be rotated relative to the other shell member 22 so that the ends of the cord 14 from the assembly 10 are in line and it appears that the cord 14 goes in one side of the cord reel assembly 10 and comes out diametrically on the other side of the cord reel assembly 10.

It will be apparent from the foregoing description that the cord reel assembly 10 of the present invention provides a number of advantages, some of which have been described above and others of which are inherent in the cord reel assembly 10.

First of all, the cord reel assembly 10 provides a simple means for winding up excess cord 14 within an enclosed area, i.e., the area within the shell members 20, 22 of the cord reel assembly 10.

In particular, the cord reel assembly 10 of the present invention has a very simple construction such that it only comprises six pieces. In this respect, there are two hub-forming members 16, 18, two shell members 20, 22, the central plate 24 and the plastic rivet-like member 26. Also, the shell members 20, 22 and the hub-forming members 16, 18 are identical such that in manufacturing all the parts, only four parts need to be manufactured.

Also, it will be apparent from the teachings of the present invention that some modifications can be made to the assembly 10 without departing from the teachings of the invention.

Accordingly, the scope of the invention is only to be limited as necessitated by the accompanying claims.

I claim:

1. A cord reel assembly for receiving a loop of a cord through an opening in the assembly such that the loop can be wound up within the cord reel assembly, said cord reel assembly comprising first and second identical hub-forming members, each hub-forming member having a cylindrical section with an inner end facing toward the inner end of the cylindrical section of the other member and having an annular disc shaped section extending outwardly from said cylindrical section at the outer end thereof, a plate positioned between said inner ends of said cylindrical sections of said hub-forming members, first and second identical annular opposed shell members, each having a generally concave cross section in a radial direction that extends from an inner circumferential edge thereof upwardly and inwardly toward an outer inwardly positioned circumferential edge where each such shell member abuts the opposed shell member, said disc section of each hub-forming member having an outer circumferential edge which overlaps, on the outside, said inner edge of one of said shell members, means for holding said cylindrical sections together with said plate situated between the inner ends thereof to form a hub assembly with said outer circumferential edge of each said disc section bearing against one of said shell members to hold said shell members in place with the outer circumferential inner edges thereof in abutting relationship, said shell members having means for limiting relative rotation therebetween, each shell member having a notch extending into said shell member from the outer circumferential edge thereof and adapted to register with an opposed identical notch in the opposed shell member, said plate having a radially extending slot therein adapted to be rotated into alignment with said notches when said notches are in registry with each other for forming means for receiving a loop of a cord, and manually manipulatable means on the outer surface of each disc section of each hub-forming member for enabling said hub assembly to be rotated by hand relative to said shell members after a loop of a cord has been inserted through said aligned notches and into said slot for winding up excess cord.

2. The cord reel assembly according to claim 1 wherein said holding means is a rivet-like member.

3. The cord reel assembly according to claim 1 wherein all the components thereof are made of plastic.

4. The cord reel assembly according to claim 3 wherein said holding means is a plastic rivet-like member.

5. The cord reel assembly according to claim 1 wherein said inner end of each cylindrical section includes an annular end surface with a projection extending therefrom, said plate having a central opening and two apertures radially displaced from said central opening, each aperture being adapted to receive said projection extending from one of said annular end surfaces, said projections and mating apertures defining part of said means for holding said hub-forming members together with said plate clamped therebetween and with said plate fixed against rotation relative to each one of said hub-forming members so as to be rotatable therewith, and wherein said holding means further comprise a plastic rivet which extends through said cylindrical sections of each of said hub-forming members and through said central opening of said plate for holding said hub-forming members together with said plate clamped therebetween.

6. The cord reel assembly according to claim 1 wherein said inner end of each said cylindrical section has an end plate portion which is of shorter length than said cylindrical section and which defines said annular end surface, said end plate portion having an end opening therethrough of smaller diameter than the interior diameter of said cylindrical section and said plate having a central opening therein which is aligned with said end openings for receiving a short plastic rivet therethrough which forms part of said means for holding said hub-forming members together.

7. The cord reel assembly according to claim 1 wherein said manually manipulatable means are defined by two diametrically aligned radially extending ribs each extending from an outer edge of said disc section to an inner edge of said disc section which inner edge defines the inner diameter of said cylindrical section.

8. The cord reel assembly according to claim 1 wherein the outer inwardly facing edge of each of said shell members has an annular face with an annular groove therein extending part way around the annular face and with an arcuate rib extending outwardly from said face between the ends of said annular groove and adapted to be receive in the annular groove in the opposing annular face of the other shell member, said ribs forming said means for limiting relative rotation of said shell members whereby said shell members can be rotated relative to each other until the end of one rib abuts the end of the other rib and in one such abutting position, said notches in said shell members are in registry with each other.

* * * * *